United States Patent [19]

Rajadhyaksha et al.

[11] Patent Number: 4,716,060
[45] Date of Patent: Dec. 29, 1987

[54] WATER PROOFING AND PRESERVATIVE METHODS

[76] Inventors: Vithal J. Rajadhyaksha; Nelly M. Rajadhyaksha, both at 27436 Esquina, Mission Viejo, Calif. 92691

[21] Appl. No.: 859,059

[22] Filed: May 2, 1986

[51] Int. Cl.$^4$ .................. A01N 3/00; B27K 3/00; B32B 9/04
[52] U.S. Cl. .......................... 428/15; 8/402; 8/436; 106/2; 106/18.32; 106/34; 106/287.25; 428/457; 428/473; 428/537.1; 428/540; 428/703; 540/485
[58] Field of Search .............. 106/2, 8, 15.05, 18.32, 106/34, 287.25; 8/402, 436; 540/485; 428/15, 457, 473, 537.1, 540, 703

[56] References Cited

U.S. PATENT DOCUMENTS

| | | | |
|---|---|---|---|
| 2,225,603 | 12/1940 | Lubs | 8/402 |
| 2,225,604 | 12/1940 | Lubs et al. | 8/402 |
| 3,705,857 | 12/1972 | Clarke et al. | 252/170 |
| 3,794,524 | 2/1974 | Nogueira et al. | 252/171 |
| 3,989,816 | 11/1976 | Rajadhyaksha | 514/50 |
| 4,316,893 | 2/1982 | Rajadhyaksha | 514/50 |

OTHER PUBLICATIONS

Alexander et al., *Journal of Economic Entomology*, vol. 56, 1963, pp. 58–60.
Stoughton; R. and McClure; W. O. *Drug Development and Industrial Pharmacy*, 9 (4), pp. 725–744, (1983).
Alexander et al., *Journal Chem. Eng. Data*, vol. 7, pp. 263–264, (1962).

*Primary Examiner*—Paul Lieberman
*Assistant Examiner*—Linda D. Skaling
*Attorney, Agent, or Firm*—Grant L. Hubbard

[57] ABSTRACT

The coating of surfaces to impart gloss and protect from weathering, and the use of solvents in paint formulations, are disclosed; the following being exemplary: Compounds having the formula:

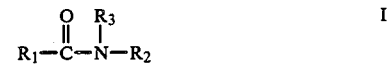

wherein $R_1$, $R_2$, and $R_3$ are saturated alkyls having from 2 to 20 carbon atoms therein. $R_1$ and $R_2$, or $R_2$ and $R_3$, alternatively, may be the same and form a nitrogen heterocyclic compound such as that derived from, for example, a pyrrolidine, a piperidine or a hexahydroazepine. Exemplary compounds include: N,N-diethyldodecanamide; N,N-di-n-propyldodecanamide; 1-dodecly-2-pyrrolidone; 1-dodecyl-2-piperidone; 1-dodcylhexahydro-2H-azepin-2-one; 1-dodecanoylpiperidine; 1-dodecanoylpyrrolidone; 1-dodecanoylhexahydroazepine; N,N-diethylhexadecanamide; N,N-di-n-propylhexadecanamide; 1-hexadecyl-2-pyrrolidone; 1-hexadecyl-2-piperidone; 1-hexadecylhexahydro-2H-azepin-2-one; 1-hexadecanoylpyrrolidine; 1-hexadecanoylpiperidine; 1-hexadecanoylhexahydroazepine; N,N-dioctylbutanamide; N,N-didodecylbutanamide. N-dodecyl-N-butylethanamide and N-ethyl-N-hexadecylpropanamide.

25 Claims, No Drawings

WATER PROOFING AND PRESERVATIVE METHODS

FIELD OF THE INVENTION

This invention relates to methods of preserving wood, leather, concrete and other materials by the application of compounds not heretofore known or considered as preservative materials, and to preserved materials prepared by the principles of the present invention.

BACKGROUND OF THE INVENTION

The prior art is replete with methods and compositions for the treatment of wood, leather, concrete and other materials to preserve, protect or otherwise modify the material or the surface thereof. It is common practice, for example, to treat wood which is to be exposed to weather or buried to prevent discoloration, rot, attack by insects, fungus, worms, etc. While there are many approaches to this serious and continuing problem, most methods may be categorized within one or more of the following general approaches:

Coating to Seal the Surface:

This method is often used in conjunction with one or more additional methods and comprises forming a moisture barrier on the surface to be protected which prevents the moisture from reaching the body of the material. Paints, generally, e.g. drying oil, setting and emulsion paints, may be considered the largest group of coatings within this category. Bituminous tar is frequently used for this purpose. Other examples include: alkyd resins, U.S. Pat. No. 4,404,239; and thermosetting resins of various types, U.S. Pat. No. 4,198,200.

Toxic Material Treatment:

Arsenic compounds and compounds of other heavy metals and other compounds which are toxic to insects, worms, etc. and which may or may not protect against fungus and wet or dry rot are often impregnated into wood, etc. Such compounds are often forced under pressure into the body of wood which is to be buried or used on foundations or in humid climates, etc., to protect the entire body, e.g. U.S. Pat. No. 4,379,073. Among the exemplary compositions which have been used in these treatments and which may be used as an additional factor in the methods of the present invention are: alkyl ammonium salts, e.g. U.S. Pat. No. 4,510,074; molybdenum or sodium tungstate, U.S. Pat. No. 4,504,468; boric acid and borates, e.g. U.S. Pat. Nos. 4,461,721, 4,400,298; mixtures of carboxamide compounds and organic aluminum compounds, e.g. U.S. Pat. No. 4,447,448; Phenol and phenol based compounds, pentachlorophenols in particular, e.g. U.S. Pat. Nos. 4,433,031, 4,388,215, 4,288,249; halogen containing organic compounds of many types, e.g. halo-acrylic acid, U.S. Pat. No. 4,421,766, halo substituted ethers, U.S. Pat. No. 3,629,477, halo-substituted polymers, U.S. Pat. No. 4,269,626; sulfonic acids, halo-sulfonic acids and sulfamides, e.g. U.S. Pat. Nos. 4,402,980, 4,148,901; copper, zinc and chromate salts, U.S. Pat. Nos. 4,374,852 and 4,323,447; organic ionizable compounds such as quaternary ammonium halides, and phosphorus and sulfur containing organic acids, U.S. Pat. No. 4,360,385; halosulfamides, U.S. Pat. No. 4,337,093; fluoromides, U.S. Pat. No. 4,282,241; hydroxylamines, U.S. Pat. No. 4,143,153, organotin compounds, U.S. Pat. Nos. 3,889,025 and 3,839,052; hydroxylamines, U.S. Pat. No. 3,725,544; isoxazole derivatives, U.S. Pat. No. 3,692,796; carbamyltetrahydropyrimidines, U.S. Pat. No. 3,671,522; indoles, U.S. Pat. No. 3,637,747; substituted quinolizines, U.S. Pat. No. 3,578,668; and oxazolines, U.S. Pat. No. 3,577,428. Tertiary and secondary butyl dinitrophenols with and without heavy metal salts, e.g. chromium, arsenic, etc., or fluorine compounds are known to be preservatives, Conradie, W. E. and Pizzi, A., *Holzforschung and Holzverwertung* 37 (1985) 3, pp 50–56.

Water Repellants:

Hydrophobic materials, alone or in combination with other materials, are commonly used to fill the pores, coat the fibers or form a film to prevent access by water and the elements to the material to be protected: e.g. paraffin waxes, U.S. Pat. No. 4,539,047; U.S. Pat. No. 4,389,446; oxysilazanes, U.S. Pat. Nos. 4,013,074, 3,665,027; and siloxanes, U.S. Pat. Nos. 3,956,174 and 3,702,769.

Some of the compositions exhibit more than one protective characteristic and, therefore, it is often only partially correct to categorize a composition within a given activity characterization, thus the above categories must be viewed as a general classification of a principal mode of action only.

While it can be predicted that certain classes of compounds can be expected to exhibit a preservative effect if they can be applied in a form and manner in which they will adhere to the material to be protected, e.g. halogen compounds of several types, phenolic compounds and heavy metal compounds, it is generally impossible to predict the effect of a given composition as a preservative. One major problem with many preservatives is that they destroy or greatly affect the surface of the material to be protected in a deleterious way. Some materials cover the surface, thus losing the entire texture and color of the surface, and some, especially water containing preservatives, heavy metal compounds, etc., discolor the surface. Most protective materials tend to reduce the coloration and texture of the surface and, thus greatly reduce the aesthetic effect of a surface. This is very important with respect to wood, for example, and often with respect to leather and concrete. Some protective and preservative materials make wood and concrete floors quite slick and, therefore unsafe for walking, thus precluding or limiting the utility in such applications.

It is a significant feature of this invention to provide a composition and a method, as well as a product, wherein the surface of the product is protected from the effects of moisture and aging and wherein the surface characteristics such as color and texture are enhanced.

SUMMARY OF THE INVENTION

A body having a surface comprising a layer of a compound having the formula set forth below thereon to protect, preserve and enhance the color and/or texture of the surface is disclosed. The compounds suitable for this purpose have the general formula:

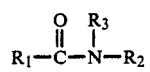

wherein $R_1$, and $R_2$, and $R_3$ are saturated alkyls having from 2 to 20 carbon atoms therein. $R_1$ and $R_2$, or $R_2$ and $R_3$, alternatively, may be the same and form a nitrogen heterocyclic compound such as, for example, derivatives of pyrrolidine, piperidine, and hexahydroazepine.

These compounds are known, per se, and generally are known to have various medicinal values, e.g. as penetration enhancers, but were not heretofore known to have any value or effect as preservatives for such materials as wood, leather, concrete, rubber, metal, some painted surfaces, and some polymeric surfaces. Reference is made copending patent application Ser. No. 783,621 and to the following U.S. patents and the references cited therein for methods of synthesizing these compounds: U.S. Pat. Nos. 3,989,815, 3,989,816, 3,991,203, 4,122,170, 4,316,893, 4,405,616, 4,415,563, 4,422,970 and 4,423,040.

The present inventive method may include in the treating composition and in the treated surface compounds to enhance various preservative or protective features or to modify the appearance of the treated surface. For example, the insecticides, fungicides, and biocides generally referred to in the patents cited hereinbefore and those known in the art may be used in amounts which do not substantially change the characteristics of the present invention. Dyes, stains and other color or texture modifying materials may also be added. The articles of commerce which may result from the use of the present invention and are encompassed in one form of the invention may include an article having a surface substantially saturated with the compounds of this invention previously mentioned, alone or in mixture, and having lower layers of the substance also treated with these compounds, and may also have the surface substantially saturated or coated with a dye, stain, or coloring agent or coated with an anti-skid, flatting or other agent to modify the texture or appearance of the surface. So long as the surface treatment is substantially coated or saturated with one or more of the preservative compounds mentioned before, i.e, the composition of treatment consists essentially of such compounds, then the advantages of this invention may be obtained.

In another facet, the invention comprises a body having a surface which is coated or saturated with one or more of the aforementioned preservative compounds. The body is, in a preferred embodiment, a body of wood, such as a wall, post or pole, railing, fence, lattice, step, porch, flower box, or other object constructed or composed substantially of wood. Included within the above form of the invention are such bodies which also included dyes, stains, flatting agents or other agents to impart a particular color, texture or other feature to the surface, and which do not substantially interfere with the preservative and protective effect of the compositions of the present invention.

DESCRIPTION OF THE PREFERRED EMBODIMENT

The method of the present invention comprises coating the surface of the material to be treated with one or more of the following compounds:

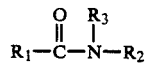

I wherein $R_1$, $R_2$, and $R_3$ are saturated alkyls having from 2 to 20 carbon atoms therein. $R_1$ and $R_2$, or $R_2$ and $R_3$, alternatively, may be the same and form a nitrogen heterocyclic compound such as that derived from, for example, a pyrrolidine, a piperidine or a hexahydroazepine.

Exemplary compounds include: N,N-diethyldodecanamide; N,N-di-n-propyldodecanamide; 1-dodecyl-pyrrolidone; 1dodecyl-2-piperidone; 1-dodcylhexahydro-2H-azepin-2-one; 1-dodecanoylpiperidine; 1-dodecanoylpyrrolidine; 1-dodecanoylhexahydroazepine; N,N-diethylhexadecanamide; N,N-di-n-propylhexadecanamide; 1-hexadecyl-2-pyrrolidone; 1-hexadecyl-2-piperidone; 1-hexadecylhexahydro-2H-azepin-2-one; 1-hexadecanoyl-pyrrolidine; 1-hexadecanoylpiperidine; 1-hexadecanoylhexahydroazepine; N,N-dioctylbutanamide; N,N-didodecylbutanamide. N-dodecyl-N-butylethanamide and N-ethyl-N-hexadecylpropanamide.

The method can be carried out using a pure compound, a mixture of compounds without diluent or carrier, one or more compounds in a diluent or carrier, or any of the above with an effective amount of another compound or other compounds which provide particular characteristics, such as dyes, stains, insecticides, biocides, etc., which may modify the color, texture or resistance of the surface, and to some extent the body, of the material treated to attack or decay by particular organisms or agents. Generally speaking, solutions of at least 20 weight percent of the subject compounds are preferred, but the level is not critical— substantially the same effect can be obtained using a high-concentration solution once or twice or a low-concentration solution several times to substantially saturate the surface fibers, particles or other surface structure of the body.

The compounds are quite soluble in lower alcohols, as well as in other nonpolar organic solvents. A high degree of polarity is not required in the solvent, however, and a great variety of pure or mixed solvent systems may be used. Lower alcohols and diethers, as well as lower dialkyl amides, e.g. dimethyl formamide, dimethyl acetamide and N-methyl pyrrolidone are preferred.

Dyes and stains of the type conventionally used in wood and leather treating compositions, pigments such as used in finishing concrete, flatting agents such as used in paints, and other similar agents may be added without destroying the preservative value of the present invention.

Microbially effective materials such as those described in the United States listed in the Background of this Patent may be used to obtain the desired resistance to insects, worms, rot, fungus, etc., without departing from the present invention.

In general, any composition which does not react with the compounds of the invention and does not interfere with the action of these compounds upon the surface may be used. For example, ultraviolet absorption compounds, which are well-known in the polymer and paint arts may be used in conjunction with the present invention without departing from the concept and principle thereof.

The method may be carried out commercially in appropriately vented application and drying equipment, and the compounds of the invention may be forced to penetrate the body using pressure, as is conventionally done in the preparation of certain wood products which are treated to resist moisture, rot, insects, etc. The method may also be carried out by hand using a brush, roller applicator, spray or any other convenient applicator.

The amount of compound required varies with the composition and texture of the surface to be treated. Highly porous surfaces, especially fibrous bodies, may require a much higher quantity of compound than, for example, a smooth concrete or rubber surface. An effective amount of the compound is considered to be that amount which costs all structure which forms the surface, whether the structure is particulate, fibrous, laminar or otherwise. In general, though not always, it is necessary to saturate the surface structure with the compound used in the treatment.

The following compounds are exemplary of those which are effective in the present invention, it being understood that homologs and analogs of these compounds and of those following within the general formula may be regarded as equivalents:

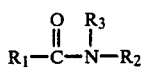
$$R_1-\overset{O}{\overset{\|}{C}}-\overset{R_3}{\overset{|}{N}}-R_2 \qquad I$$

wherein $R_1$, $R_2$ and $R_3$ are saturated alkyls having from 2 to 20 carbon atoms therein. $R_1$ and $R_2$, or $R_2$ and $R_3$, alternatively, may be the same and form a nitrogen heterocyclic compound such as derivatives of pyrrolidine, piperidine, or hexahydroazepine. N,N-diethyldodecanamide; N,N-di-n-propyldodecanamide; 1-dodecyl-2-pyrrolidone; 1-dodecyl-2-piperidone; 1-dodecylhexahydro-2H-azepin-2-one; 1-dodecanoylpiperidine; 1-dodecanoylpyrrolidine; 1-dodecanoylhexahydroazepine; N,N-diethylhexadecanamide; N,N-di-n-propylhexadecanamide; 1-hexadecyl-2-pyrrolidone; 1-hexadecyl-2-piperidone; 1-hexadecylhexadro-2H-azepin-2-one; 1-hexadecanoylpyrrolidine; 1-hexadecanoylpiperidine; 1-hexadecanoylhexahydroazepine; N,N-dioctylbutanamide; N,N-didodecylbutanamide; N-dodecyl-N-butylethanamide; and N-ethyl-N-hexadecylpropanamide.

The invention also contemplates the body which results from application of the compounds. The following are exemplary:

A body of wood having the surface structure thereof substantially saturated with a composition as described hereinabove.

A body of concrete having at least one surface coated with one or more of the aforesaid compounds is also contemplated by the invention.

A leather body having at least one surface area structure substantially saturated with one or more of the aforesaid compounds is a particularly described form of the invention.

The present invention encompasses the binding of polar dyes and paints to wood and wood derivatives, such as cellulose, better penetration of dyes and paints into the material, as distinct from just laying a film of dye on the surface.

The present invention provides long duration protection not heretofore available.

A rubber, metal, plastic (polymeric) or other surface having the surface structure substantially saturated with one or more of the compounds referred to above is within the contemplation of the present invention. The term "plastic" is used here in the conventional layman's connotation of a polymeric material such as, for example, polymethylmethacrylate (Plexiglass), polyvinyl chloride, polystyrene, copolymer of vinyl chloride and vinyl actate, polycarbonate, polymers and copolymers of acrylic acid and methyl and ethyl acrylates, etc.

The surface is, preferably, allowed to dry and permit complete absorption for a period of up to 24 hours, though this is not a critical feature of the invention. Heating increases the drying rate, but is not necessary. The surface may be rubbed, polished or otherwise treated, e.g. waxed or polished.

The resulting surface has a number of very desirable characteristics. The surface is lipophilic, dry and, unless texture modifiers are added, has substantially the same texture and feel as the untreated surface. The natural colors of the surface are enhanced and contrasting colors are more striking, unless color modifiers are used. The surface sheds water, which "beads" on the surface as on wax. The surface is dirt and stain resistant and does not exhibit electrostatic attraction of dust and other particles. The surface is resistant to oxidation by ozone, sulfur dioxide etc., and resists degradation by acids and other enviromental contaminants. The bodies of the invention thus find special application in industrial plants and in areas which are afflicted with industrial and automobile air pollution. These features are of special value in protecting rubber and plastic surfaces and certain metals such as roof and structural metal surfaces.

EXAMPLE I

Leather may be treated, for example, by dipping or spray coating, with a solution consisting essentially of from 5% to 80% of a compound described, such as 1-dodecyl-hexahydro-2H-azepin-2-one, a trace amount of dye, and from %5 to 50% n-methyl pyrrolidone or alcohol or glycol ether EE, or a mixture of the same. The resulting product will resist water penetration, have an enhanced and colored surface which emphasizes the structure and feel of leather. If deep penetration is desired, the leather may be run through a nip in a body of the treating liquid. Non-polar commercial red leather dye in commercial alcohol-glycol ether EE solvent system, (available from Tandy stores), penetrated leather to a virtually imperceptible degree, remaining essentially on the very surface of the leather; whereas the same dye in a solution of 1-dodecylhexahydro-2H-azepin-2-one penetrated 2 mm after a single application. This greater penetration into wood and leather, etc., results in a richer finish, and also in articles which are much less subject to serious damage by minor scrapes, cuts, and abrasions, and which resist the efforts of moisture much better than the prior art.

Example 1 may be further modified by the addition of wax, e.g. carnauba wax, or organopolysiloxanes (silicones) to provide a more shiny surface which many find attractive for certain uses.

EXAMPLE II

N,N-diethyldodecanamide coated rubber tires will resist oxidation cracking and maintain a healthy smooth, shiny surface longer than untreated tires.

EXAMPLE III 1-dodecanoylpiperidine coated vinyl automobile roof resists soiling, sun degradation and weathering.

EXAMPLE IV

A three-year old weathered wood sample which was grey and dull was sanded and treated with 1-dodecylhexahydro-2H-azepin-2-one and subjected to walking and weathering stress for three months. When water was poured on the treated area, it beaded and ran off. The treated area maintained the texture and appearance of new wood through this period from walking, rains, sunshine and the smog of Southern California.

EXAMPLE V

A concrete step on a swimming pool deck was treated with 1-dodecylhexahydro-2H-azepin-2-one in three different areas, by painting the surface and allowing it to dry for a few minutes (10 to 20 minutes). When water was poured on the steps, the untreated areas absorbed the water and remained wet for an hour or so. The treated areas shed the water and dried immediately. The same result was observed after three months exposure to sun, weather and chlorinated pool water.

EXAMPLE VI

A portion of a six-year old outdoor swing set which was badly weathered and grey from six years of outdoor exposure was coated with 1-dodecylhexahydro-2H-azepin-2-one. The surface film was removed without affecting the paint, giving the treated surface the appearance of a newly painted object. After three months of outdoor exposure to sun and rain, the treated area remained shiny and new-looking.

EXAMPLE VII

A 5% solution of 1-hexadecyl-2-piperidone in Freon can be used as an aerosol spray for the restoration of painted or unpainted surfaces, simply by applying the spray to the surface and rubbing the surface with a soft cloth.

EXAMPLE VIII

Four blocks of redwood were cut from a red stained redwood plank. Two blocks were sanded to remove the stain. One of the sanded blocks was painted with 1-dodecylhexahydro-2H-azepin-2-one and the other sanded block was untreated and used as a control. The two unsanded blocks were handled in the same way; one was painted with the compound and one was left unpainted. All of the blocks were exposed to the rain, sun, etc, of the outside Southern California environment. The treating compound penetrated both of the treated blocks readily, the penetration being measured at 12 mm in two days and 18 mm in a week. On foggy mornings, the untreated blocks absorbed moisture and remained wet for a number of hours depending upon the temperature, while the treated surfaces beaded the water and shed it without becoming wet. The treated surfaces remained fresh and new looking, one exhibiting the wood grain with enhanced color and contrast of the grain and the other having the appearance of a newly painted surface.

EXAMPLE IX

Four blocks, identified as blocks A, B, C, and D, were cut from a single piece of redwood, and ⅔ of the top of each block was sanded smooth. Block A was treated with a commercially available water seal, THOMPSON'S WATER SEAL (Trademark). Block B was untreated and used as an outside environment control. Block C was painted with 1-dodecylhexahydro-2H-azepin-2-one. Block D was untreated and used an an inside environment control. Blocks A, B, and C were exposed to the outside environment with dew and fog most nights, sun most days, and occasional rain. Blocks A and C both shed water to some degree; however, block C shed the water better and dried from the morning dew very much faster than block A; both blocks A and C dried much faster than block B which absorbed the water and remained wet for one to three or more hours depending on the humidity and temperature. The surface of block A was darkened with some enhancement of grain contrast. The surface of block C was brightened, showing the bright red color of the wood and greatly enhancing the contrasts between the types of grain showing in the block. These bright colors and sharp contrasts were retained by block C even through several weeks of environmental cycling as described. Block A continued to shed water but was not significantly different in appearance from the original appearance of the control block B. Block B dulled and greyed with the weathering. Block D, the internal control, retained the original dull surface.

EXAMPLE X

Four blocks of aged redwood from old outdoor furniture were treated the same as described in Example IX with substantially the same results.

EXAMPLE XI

A six by six inch square on the hood of a 12-year old car was treated with wiping 1-dodecylhexahydro-2H-azepin-2-one on with a cotton ball. Other areas of approximately the same size were coated with kerosene and a polymer sealant sold by Deep Seal International. The 1-dodecylhexahydo-2H-azepin-2-one did not remove paint, but penetrated into the painted surface, giving it a shiny, glossy finish which lasted the period of observation, 10 weeks. The other two areas treated with kerosene and sealer shed water quite well at first, as did the area treated according to this invention, but the sealer and kerosene treated surfaces became dull and began to lose the ability to shed water effectively by the third week.

EXAMPLE XII

Slate treated as described above with a cotton swab showed penetration of the compound 1 cm in 3 days and dried much faster when wetted when compared with the control.

EXAMPLE XIII

Pine and cedar blocks treated as described exhibited a "new wood" appearance and water repellancy and retained both for a period of three months of observation under outdoor environmental conditions, while controls darkened, lost color and became grey.

EXAMPLE XIV

A twenty percent solution of 1-dodecylhexahydroazepine when sprayed or painted on wood, rubber, plastic or leather will form a surface which is bright, shiny and water repellant.

EXAMPLE XV

An exemplary solution for treating leather comprises:

| | |
|---|---|
| N,N—di-n-propyldodcanamide | 25 v/o |
| Ethanol | 72 v/o |
| Polydimethylsiloxane | 3 v/o |

The solution is applied to the exposed surface of the leather to provide a shiny, water repellant surface. The entire piece of leather, e.g. a belt, can be dipped in the solution to make the belt water repellant and quite suitable for use by campers and hikers.

EXAMPLE XVI

An exemplary solution for treating redwood posts, one end of which is to be buried in moist soil comprises:

| N,N—diethyldodecanamide | 30 v/o |
| --- | --- |
| 1-hexadecyl-2-piperidone | 30 v/o |
| 1-dodecylhexahydro-2H—azepin-2-one | 5 v/o |
| Pentachlorophenol | 1 v/o |
| Na—N—nitroso-N—cyclohexylhydroxylamine | 1 v/o |
| Isopropanol | 33 v/o |

The post is dipped in the solution or sprayed or painted with the solution to enhance the color and contrast of the grain and to make the surface water repellant, and insect and fungus resistant.

EXAMPLE XVII

Pieces of various types of wood, new Douglas fir, aged Douglas fir and Hemlock fir were treated with solutions of indigo carmine, neutral red and 4', 5'-dichlorofluorescein (D & C Orange No. 8) in 3:1 N-methylpyrrolidone:1-dodecyl-hexahydro-2H-azepin-2-one. A solution of 4',5'-dichloro-fluorescein in N-methylpyrrolidone was used as a control. These water soluble dyes penetrated much better when applied in a solution of a solvent systems of this invention, including, e.g. 1-dodecylhexahydro-2H-azepin-2-one.

EXAMPLE XVIII

A piece of Hemlock fir was treated with a non-polar red dye commonly available commercially for dying leather. When applied in a solution of 1-dodecylhexahydro-2H-azepin-2-one, the dye penetrated up to 1 cm as compared with virtually no penetration when applied in the commercial alcohol-glycol ether EE solvent. Water repellancy of the dye-1-dodecylhexahydro-2H-azepin-2-one solution treated wood was very much superior to the water repellancy of the wood treated with the dye-alcohol-glycol ether solution. The following composition appeared optimum for good penetration and water repellancy, though the proportions are not at all critical:

| Non-polar red dye (Tandy Leather Co.) | 10 v/o |
| --- | --- |
| Ethyl alcohol | 35 v/o |
| Glycol Ether EE | 35 v/o |
| 1-dodecylhexahydro-2H—azepin-2-one | 20 v/o |

It will be apparent from the foregoing examples and teachings that the solvents of this invention, which include the listed compounds alone or in mixture with each other, for economy, in mixture with other solvents, are a unique family of solvents having a broad range of application in the coating industry. Stains, paints, and dyes flow more smoothly, penetrate and adhere more deeply and firmly, provide a high degree of water repellancy and resistance to oxidation and other weathering effects and result in a richer looking surface with greater resistance to marring. Thus, while one could possibly have expected these compositions to act to one degree or another as solvents, the results discovered and demonstrated by these examples and taught herein are most unexpected and unpredictable.

The present invention contemplates, and includes, paints and enamels in which the aforementioned compounds are solvents. Such paints and enamels have high penetration, are strongly adherent, and provide a long lasting high gloss finish for metals, woods and other materials. An exemplary paint formulation is given simply to illustrate one of a virtually infinite variety of formulations which may be used.

An interior and exterior high gloss silicone alkyd may be formulated to include the following, using conventional paint mixing technology:

| Silicone-alkyd copolymer* | 35 wt/% |
| --- | --- |
| Titanium Oxide | 12 wt/% |
| Clay | 12 wt/% |
| 1-dodecanoylhexahydro-2H—azepin-2-one | balance |

*silicone content 35%, phthalic anhydride 15%, soy acid oil 50%

Alkyd, epoxy and other paint resins and other pigments and extenders, etc., and the class of solvents described hereinbefore may be used within the teaching and concept of this invention.

INDUSTRIAL APPLICATION

It will be understood that the above are merely suggested applications and examples demonstrating the unusual and unexpected advantages of the present invention and that the present invention will find industrial application in the preparation of leather articles, preservation of wood in the lumber and building arts, protection of rubber in the automotive and chemical process arts, and in the preservation of plastic (polymeric) surfaces in domestic, industrial and automotive applications, and as a family of solvents which outperform many ketones, glycol ether acetates and other acetates in high performance coating applications such as staining, painting and dying.

What is claimed is:

1. The method of treating the surface of wood, concrete, stone, leather, rubber, paint, or metal, comprising coating the surface with a solvent comprising from about ten percent to one hundred percent of the total solvent a compound having the formula:

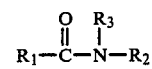

wherein $R_1$, $R_2$ and $R_3$ are saturated alkyls having from 2 to 20 carbon atoms, and wherein at least one of $R_1$, $R_2$ and $R_3$ is a saturated alkyl having at least 12 carbon atoms and wherein either $R_1$ and $R_2$, $R_1$ and $R_3$, or $R_2$ and $R_3$ is in the form of a cyclic structure, thus forming a nitrogen heterocyclic compound.

2. The method of claim 1 wherein the solvent is 1-dodecylhexahydro-2H-azepin-2-one or 1-dodecanoyl-hexahydroazepine.

3. The method of claim 2 wherein the surface is a leather or wood surface.

4. The method of claim 2 wherein the surface is a rubber, synthetic organic polymer or paint surface.

5. The method of claim 1 wherein the surface is a leather or wood surface.

6. The method of claim 1 wherein the surface is a rubber, synthetic organic polymer or paint surface.

7. A body of wood, concrete, stone, leather, rubber, paint, or metal, having at least a portion of the surface thereof coated with a solvent comprising from about ten percent to one hundred percent of the total solvent a compound having the formula:

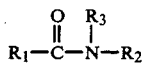

wherein $R_1$, $R_2$ and $R_3$ are saturated alkyls having from 2 to 20 carbon atoms, and wherein at least one of $R_1$, $R_2$ and $R_3$ is a saturated alkyl having at least 12 carbon atoms and wherein either $R_1$ and $R_2$, $R_1$ and $R_3$, or $R_2$ and $R_3$ is in the form of a cyclic structure, thus forming a nitrogen heterocyclic compound.

8. The body of claim 7 wherein the solvent is 1-dodecylhexahydro-2H-azepin-2-one or 1-dodecanoyl-hexahedroazepine.

9. The method of claim 8 wherein the surface is a leather or wood surface.

10. The method of claim 8 wherein the surface is a rubber, synthetic organic polymer or paint surface.

11. The method of claim 7 wherein the surface is a leather or wood surface.

12. The method of claim 7 wherein the surface is a rubber, synthetic organic polymer or paint surface.

13. The method of coloring the surface of wood, concrete, stone, leather, rubber, paint, or metal, comprising coating the surface with an effective amount of a coloring agent in a solvent comprising from about ten percent to one hundred percent of the total solvent a compound having the formula:

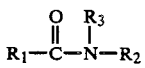

wherein $R_1$, $R_2$ and $R_3$ are saturated alkyls having from 2 to 20 carbon atoms, and wherein at least on of $R_1$, $R_2$ and $R_3$ is a saturated alkyl having at least 12 carbon atoms and wherein either $R_1$ and $R_2$, $R_1$ and $R_3$, or $R_2$ and $R_3$ is in the form of a cyclic structure, thus forming a nitrogen heterocyclic compound.

14. The method of claim 13 wherein the solvent is 1-dodecylhexahydro-2H-azepin-2-one or 1-dodecanoyl-hexahydroazepine.

15. The method of claim 14 wherein the surface is a leather or wood surface.

16. The method of claim 15 wherein the coloring agent is stain or dye.

17. The method of claim 14 wherein the surface is a rubber, synthetic organic polymer or paint surface.

18. The method of claim 13 wherein the surface is a leather or wood surface.

19. The method of claim 13 wherein the surface is a rubber, synthetic organic polymer or paint surface.

20. The colored body of wood, concrete, stone, leather, rubber, paint, or metal, having at least a portion of the surface thereof colored by coating the surface with an effective amount of a coloring agent in a solvent comprising from about ten percent to one hundred percent of the total solvent a compound having the formula:

wherein $R_1$, $R_2$ and $R_3$ are saturated alkyls having from 2 to 20 carbon atoms, and wherein at least one of $R_1$, $R_2$ and $R_3$ is a saturated alkyl having at least 12 carbon atoms and wherein either $R_1$ and $R_2$, $R_1$ and $R_3$, or $R_2$ and $R_3$ is in the form of a cyclic structure, thus forming a nitrogen heterocyclic compound.

21. The body of claim 20 wherein the solvent is 1-dodecylhexahydro-2H-azepin-2-one or 1-dodecanoyl-hexahydroazepine.

22. The body of claim 21 comprising leather or wood.

23. The body of claim 21 wherein the surface is a rubber, synthetic organic polymer or paint surface.

24. The body of claim 20 comprising leather or wood.

25. The body of claim 20 wherein the surface is a rubber, synthetic organic polymer or paint surface.

* * * * *